(12) United States Patent (10) Patent No.: US 8,583,529 B2
Greenstein (45) Date of Patent: Nov. 12, 2013

(54) METHOD OF PURCHASING A PRODUCT TO AVOID ADVERSE SELECTION

(76) Inventor: Mark Greenstein, Bethesda, MD (US)

(*) Notice: Subject to any disclaimer, the term of this patent is extended or adjusted under 35 U.S.C. 154(b) by 640 days.

(21) Appl. No.: 11/246,096

(22) Filed: Oct. 11, 2005

(65) Prior Publication Data

US 2006/0080147 A1 Apr. 13, 2006

Related U.S. Application Data

(60) Provisional application No. 60/616,841, filed on Oct. 8, 2004.

(51) Int. Cl.
*G06Q 40/00* (2012.01)

(52) U.S. Cl.
USPC .............................. 705/36 R; 705/35; 705/37

(58) Field of Classification Search
USPC ........................................... 705/36 R, 35–37
See application file for complete search history.

(56) References Cited

U.S. PATENT DOCUMENTS

| | | | |
|---|---|---|---|
| 5,126,936 A | 6/1992 | Champion et al. |
| 5,132,899 A | 7/1992 | Fox |
| 5,590,037 A | 12/1996 | Ryan et al. |
| 5,689,649 A | 11/1997 | Altman et al. |
| 5,774,881 A | 6/1998 | Friend et al. |
| 5,812,987 A | 9/1998 | Luskin et al. |
| 5,999,917 A | 12/1999 | Facciani et al. |
| 6,012,043 A | 1/2000 | Albright et al. |
| 6,018,722 A | 1/2000 | Ray et al. |
| 6,055,517 A | 4/2000 | Friend et al. |
| 6,078,904 A | 6/2000 | Rebane |
| 6,092,047 A * | 7/2000 | Hyman et al. ............... 705/36 R |
| 6,131,810 A * | 10/2000 | Weiss et al. .................... 235/379 |
| 6,154,732 A | 11/2000 | Tarbox |
| 6,240,399 B1 | 5/2001 | Frank et al. |
| 6,275,807 B1 * | 8/2001 | Schirripa ..................... 705/36 R |
| 6,278,981 B1 | 8/2001 | Dembo et al. |
| 6,332,132 B1 * | 12/2001 | Halpern ....................... 705/36 R |
| 6,411,939 B1 | 6/2002 | Parsons |
| 7,120,600 B2 | 10/2006 | Tarbox et al. |
| 7,305,347 B1 * | 12/2007 | Joao ................................. 705/4 |
| 7,580,879 B2 * | 8/2009 | Mallozzi ..................... 705/36 R |
| 7,584,107 B2 * | 9/2009 | Leisure et al. ................ 705/322 |
| 7,634,436 B1 * | 12/2009 | Wagner .......................... 705/35 |
| 2002/0035532 A1 * | 3/2002 | Halpern .......................... 705/36 |
| 2002/0169701 A1 * | 11/2002 | Tarbox et al. ................... 705/36 |

(Continued)

FOREIGN PATENT DOCUMENTS

EP 0572281 A1 1/1993

OTHER PUBLICATIONS

Restructuring retirement income plans, John G Kilgour, Compensation and Benefits Review, Saranac Lake, Nov./Dec. 2000. vol. 32, Iss. 6; 10 pages.*

(Continued)

*Primary Examiner* — Gregory Johnson
(74) *Attorney, Agent, or Firm* — Bacon & Thomas, PLLC (57) ABSTRACT

A method for providing automatic purchase of products, such as insurance products, by one or more third parties acting on behalf of a purchaser and for automatic deductions from an income source to pay for the product utilizes stored data regarding the products, information provided to a purchaser from the stored data based upon inquiries from the purchaser and concluding a purchase or not along with payment for the purchaser.

3 Claims, 6 Drawing Sheets

(56) References Cited

U.S. PATENT DOCUMENTS

| | | | |
|---|---|---|---|
| 2002/0169702 A1* | 11/2002 | Eaton et al. | 705/36 |
| 2003/0004844 A1* | 1/2003 | Hueler | 705/35 |
| 2003/0018557 A1* | 1/2003 | Gilbert et al. | 705/36 |
| 2003/0083972 A1* | 5/2003 | Williams | 705/36 |
| 2003/0105692 A1* | 6/2003 | Gilbert et al. | 705/35 |
| 2003/0187694 A1* | 10/2003 | Rowen | 705/2 |
| 2004/0054610 A1* | 3/2004 | Amstutz et al. | 705/36 |
| 2004/0138950 A1* | 7/2004 | Hyman et al. | 705/14 |
| 2004/0153387 A1* | 8/2004 | Mallozzi | 705/36 |
| 2004/0177022 A1* | 9/2004 | Williams et al. | 705/36 |
| 2005/0021363 A1* | 1/2005 | Stimson et al. | 705/1 |
| 2005/0027627 A1* | 2/2005 | Lemken et al. | 705/35 |
| 2005/0060251 A1* | 3/2005 | Schwartz et al. | 705/35 |
| 2005/0154658 A1* | 7/2005 | Bove et al. | 705/35 |
| 2006/0064304 A1 | 3/2006 | Greenstein et al. | |
| 2006/0080199 A1 | 4/2006 | Tarbox et al. | |
| 2006/0136254 A1 | 6/2006 | Greenstein | |
| 2006/0212380 A1* | 9/2006 | Williams et al. | 705/35 |
| 2006/0253364 A1 | 11/2006 | Tarbox et al. | |
| 2006/0282363 A1* | 12/2006 | Tarbox et al. | 705/35 |
| 2007/0100726 A1* | 5/2007 | O'Flinn et al. | 705/36 R |
| 2011/0087623 A1* | 4/2011 | Greenstein | 705/36 T |

OTHER PUBLICATIONS

William G. Gale et al., "Increasing Annuitization of 401(k) Plans With Automatic Trial Income", Brookings Institute, Jun. 2008, Abstract, website article—www.brookings.edu/papers/2008/06_annuities_gale.aspx, Washington, D.C.

William G. Gale et al., "The Automatic 401(k): A Simple Way to Strengthen Retirement Savings", The Retirement Security Project, No. 2005-1, Mar. 2005, pp. 1-12, Washington, D.C.

Eduardo Porter, "Can Shortcuts Be a Force for Thrift", The New York Times, Apr. 12, 2005, website article, nytimes.com, New York.

Jeffrey M. Laderman, "First, Asset Allocation. Now, "Asset Placement"", website article, Business Week Online: Your Money, Aug. 14, 1997, New York.

William G. Gale; J. Mark Iwry and Peter R. Orszag, The Retirement Security Project, The Automatic 401(k); A Simple Way to Strengthen Retirement Savings, No. 5, Jan. 2005, 16 pages.

J. Mark Iwry and John A. Turner, The Retirement Security Project, Automatic Annuitization: New Behavioral Strategies for Expanding Lifetime Income in 401(k)s, Jul. 2009, 24 pages.

* cited by examiner

METHOD OF PURCHASING A PRODUCT TO AVOID ADVERSE SELECTION

This application claims domestic priority from provisional application 60/616,841, filed Oct. 8, 2004.

FIELD OF THE INVENTION

The present invention relates to a method for providing automatic purchase and payment of products, such as insurance products.

BACKGROUND OF THE INVENTION

The individual insurance market or any group market that requires an election by one or more individuals, including that for annuities and life insurance suffers from a phenomenon known as adverse selection. This means that individuals with long-lived ancestors and/or healthy and low-risk lifestyles tend to be more likely to purchase products such as annuities that will pay them a guaranteed income (usually a specific amount) for the rest of their lives. Conversely, persons whose ancestors died of natural causes at an early age and/or who live unhealthy or high-risk lifestyles tend to be more likely to purchase products such as life insurance.

These tendencies have led to a predictable result in the pricing of these policies. The persons (typically States in the United States) who regulate insurance companies are concerned with their continued ability to honor the promises and, in this regard, typically insist on the insurance companies utilizing conservative assumptions in the pricing of these products. Also, the companies themselves are very aware of these phenomena and, in this connection, may price their products using assumptions that may even be more conservative than that used by their regulators.

For example, it has been estimated in at least one article "Adverse Selection in Insurance Markets: Policyholder Evidence from the UK Annuity Market, 2004 Journal of Political Economy 112(1) Part 1: 183-208, Amy Finkelstein and James Poterba that roughly half of the difference between what a person pays for an annuity the present value of payouts is due to adverse selection, which based on this article, means that seven and one half to ten percent of the price of this product is based on adverse selection.

Unattractive pricing resulting from the potential for adverse selection means that persons who would otherwise benefit from the purchase of this type of insurance product will do so less frequently than they otherwise would. Further, when they do purchase these products they may not purchase as much as would be optimal because of the effect of adverse selection on pricing. Also, issuers of these products could enhance their profits by reducing or eliminating adverse selection.

This is unfortunate in that many persons would benefit from insurance products with a potential for adverse selection. For most persons who purchase the most commonly known insurance products, life insurance and annuities, this means purchasing a product such as life insurance when they are younger in order to provide for their survivors if they die prematurely, and/or a product such as annuities when they are older to insure against outliving their savings.

A possible solution to this problem includes combining the purchase of insurance products and/or services in a manner that tends to reduce the risks posed by adverse selection. For example, an insurance company or intermediary or a combination of the two could combine or package an annuity together with life insurance and/or disability insurance. Another example could provide that an annuity is purchased, or available for a limited period of time, if another product is purchased either from the insurer or a third party (e.g., money management). The terms of the annuity could then depend on events that are somewhat or totally independent of the insurance risk such as the birth of a child or the performance of the investment or some benchmark related to the investment. This could mitigate the risk of adverse selection and enable persons who sell insurance products to offer them on a basis that is more attractive than would otherwise be the case.

For example, the system could project the effect on risk if life insurance of various types was sold at the same time as various types of annuities. In one example, a persons who is 30 years old could purchase term life insurance for a term of 30 years and an annuity that begins at age 75 at the same time. Since it is clear that such an individual could not claim benefits under both policies, there is at least some reduction in the risk of adverse selection by combining the two products. If this risk reduction is quantified, it could permit a seller of this combination to sell more products or improve its profits or some combination of the two. By passing along none, all, or a part of the savings to purchasers, this could enable an issuer such as an insurance company to make more profits and possibly more sales by reason of its products being more competitive in the market place.

Combining investment products with insurance products can also be attractive from the standpoint of the insurer if combined with investment products, particularly if there is an objective basis upon which the investment product could be converted to an insurance product since this would be a safeguard against adverse selection. Also the certainty of the conversion would enable insurers to cover the risks of having to provide an insurance product such as an annuity in the marketplace. For example, an insurer that has liability to provide annuities if the price of a certain index reaches a specified level could obtain interests that would enable it to hedge this risk. It could, obtain interests, either through purchase or swaps, that when combined with its existing portfolio and obligations, enable it to be in a better position able to pay the amounts due under its policies. For example it could arrange to swap a part of its portfolio (which could match the index upon which conversion is based in some of its outstanding annuity/investment products) for an option to obtain payments at a given rate of interest if the price of an index met a specified level, if that is the level that triggered an obligation to provide annuities.

The ability to hedge because of the additional certainty provided by this type of contract would permit an insurer to offer better rates on its policies, improve its profits or both when compared with the current methods of issuing annuities. Individuals will be able to purchase new products that better serve their needs at better prices. The present disclosure is then a significant improvement over the products currently being offered in the marketplace.

Yet another approach could be to offer policies that are contingent on significant life events, particularly those that do not have a direct bearing on the risks of the insurer under the policy. In such cases the policies may offer an option to increase or an automatic adjustment on the occurrence of such an event, such as marriage or the birth of a child. For example, in the case of a life insurance policy, the birth of one or more children could result in an increase in coverage. Such a birth could also result in a shift from an annuity to investments when additional funds may be needed to pay for the support of an additional child in the event of the policy holder's death. Another example could be the death of a parent. If the death resulted in a reduction in responsibility this could result in a need for less life insurance and/or a shift from stock investments to an annuity. In the converse, where there is an inheritance this could also result in a lesser need for life insurance since there is additional money to take care of survivors, but a shift to annuities since there is less need to take risk.

Yet another approach is to use automatic procedures to implement the purchase of insurance products alone or in combination with other products. As demonstrated in studies such as that conducted by Hewitt Associates in conjunction with Harvard University and the Wharton School of the University of Pennsylvania, "Enrolling Employees in 401(k) Plans Not a Cure All" more than half of the individuals remained with the automatic or default criteria for deductions from their wages and for investment selection even when there is an opt out available. The inertia that this, and similar studies have found would tend to reduce the risk of adverse selection if automatic procedures were used.

In order to address adverse selection, it is generally anticipated that a purchaser would have to pay for purchase the product or a portion of the product in cash, commit to pay in the future or employ some combination of the two. Given that this may be a major purchase, it could be appropriate to secure the purchase obligation with one or more interests in property that are owned by the persons (e.g., a mortgage on real property) and/or pay for the purchase with amounts that are deducted from the pay of the individual. In cases where the amount is deducted from the pay of individuals, the amount deducted may increase over time and the amount and/or timing of such increases may correspond to a greater or lesser extent to the increased in pay received by the person(s) who pay for the products.

SUMMARY OF THE DISCLOSURE

Therefore an object of the present invention is to address the problem resulting from the fact that currently the marker for annuities and other insurance products operates less efficiently than other markets due to the possibility of adverse selection because purchasers tend to reflect a greater probability of taking advantage of the contracts than the population in general.

The present disclosure addresses this risk by selling the insurance products and/or other products in combination, possibly with related services in a manner that reduces the risk of adverse selection. This permits more favorable pricing and/or profits margins, potentially lesser amounts of capital reserved for claims and could increase sales.

The operator of the system which may be an issuer of products inputs, or causes to be inputted formulae from one or more issuers or vendors, into a unique data processing system (e.g., a computer) that reflect the lesser risk if one or more combinations of products, which may be combined with related services. This system may take into account the amount committed to be paid by a purchaser of the combination of products, as well as possibly the nature of the commitment (e.g., by a mortgage on real estate or whether amounts are withheld by an employer from the pay of the employee). The inputted data will generally include actual and/or projected experience data concerning claims based on how combining different elements in different amounts affects risk/likelihood of claims, which can further refine the accuracy of predicting the reduced risk and will generally be stored in a storage device. The system may also input data concerning the quotes of competitive products that are, or are not bundled, in order to increase the competitive advantage of users of the system who may then adjust their product offerings to maximize the advantages conferred by the system.

The system then can be used by issuers of products and/or intermediaries such as insurance agents to provide quotes on packages of products to potential purchasers of these products, based on formulae provided by one or more issuer(s) either directly or through intermediaries. The system can take into one or more of the elements listed above, depending on the state of the markets and/or the business objectives of the users of the system.

One representative system for combining insurance products with other services could provide for the automatic purchase of an insurance product such as an annuity with some or all of the proceeds of the sale of an investment if the investment product appreciates sufficiently to achieve this goal by the purchase of an insurance product. This can assist a purchaser who wishes to make sure a certain minimum level of income is achieved, in reaching this goal.

Under another representative system a purchaser could purchase an insurance product from an issuer directly or though one or more intermediaries, perhaps using a computer or other data processing device and perhaps after having received quotes from one or more intermediaries. This product could feature automatic adjustments based on specified significant life events that are somewhat or wholly separate from an adverse risk to the issuer of the policy. As part of the sale of the product the system could notify the issuer of the event that causes an adjustment in the product, which could be processed by a data processor and stored in a storage device. Such devices could automatically reflect the changes in terms of the product when a specified life event occurs. Such devices could also provide notice of the changes.

Under another representative system, a third party such as an employer could act on behalf of a purchaser possibly using a data processing device to determine whether to purchase and possibly to effectuate the purchase of an insurance product, from an issuer possibly through one or more intermediaries generally without an affirmative election from the purchaser generally if it determines that it has a minimum amount of data in a storage device or otherwise to do so. A storage device would to store the transaction. The third party, which may be the employer of the purchaser or a person acting on behalf of an employee benefit plan then arranges for the purchase to be automatically paid for from an income source such as the wages of an employee by using a data processing device associated with a record-keeper of the income source, to automatically deduct amounts from the income source to pay for the insurance product. The purchaser is generally informed of the purchase by the issuer or the third party which generally uses a data processing device and stored information to do so, and the purchaser may in some cases opt out of the purchase of the product by affirmatively contacting the third party or issuer. In cases where the purchaser opts out then the third party and/or the issuer arrange for the amounts from the income of the purchaser to fully or partially cease generally using a data processing device and/or a storage device to assist them in doing so. The purchaser may also be contacted by an intermediary, which may use a data processor and/or storage device to assist it in performing some or all of the aforementioned functions.

The third party is generally independent of the issuer in a manner that ameliorated or eliminates the conflict of interest normally present in such a transaction. This may be communicated to the purchaser at any time, including in connection with the purchaser's ability to opt out, if such ability is present.

In all cases the data processing devices utilize software to help effectuate transactions under the program.

Other objectives and advantages of the present application will become apparent form the following description, the accompanying drawings and the appended claims.

Here is a suggested claim. My intent is not to spend much time on the claims, but to revisit this area at a late time when hopefully more time and resources are available.

DETAILED DESCRIPTION OF THE PREFERRED EMBODIMENT

In carrying out the present invention in representative preferred forms thereof, we have provided a representative new and innovative program for the purchase of insurance products (4) that includes representative systems and representative methods for providing representative services in combining the acquisition of insurance products in a manner that reduces or eliminates the phenomena of adverse selection.

Figure 1:
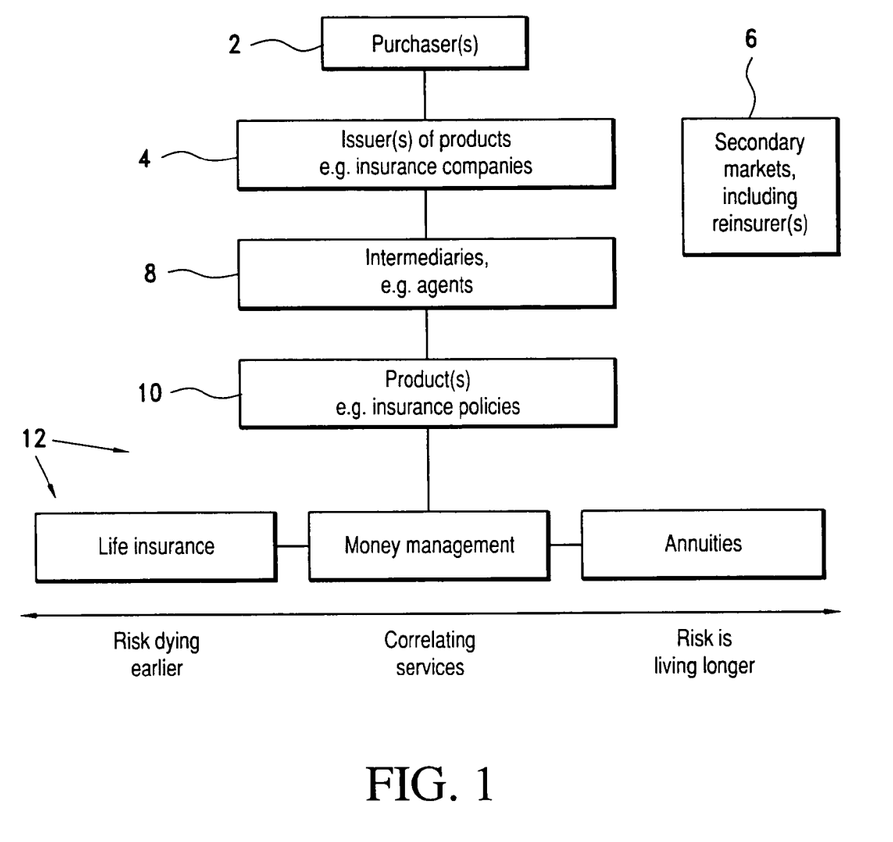
FIG. 1 is a block diagram illustrating parties, products and services included in the operation of the disclosure.
Figure 2:
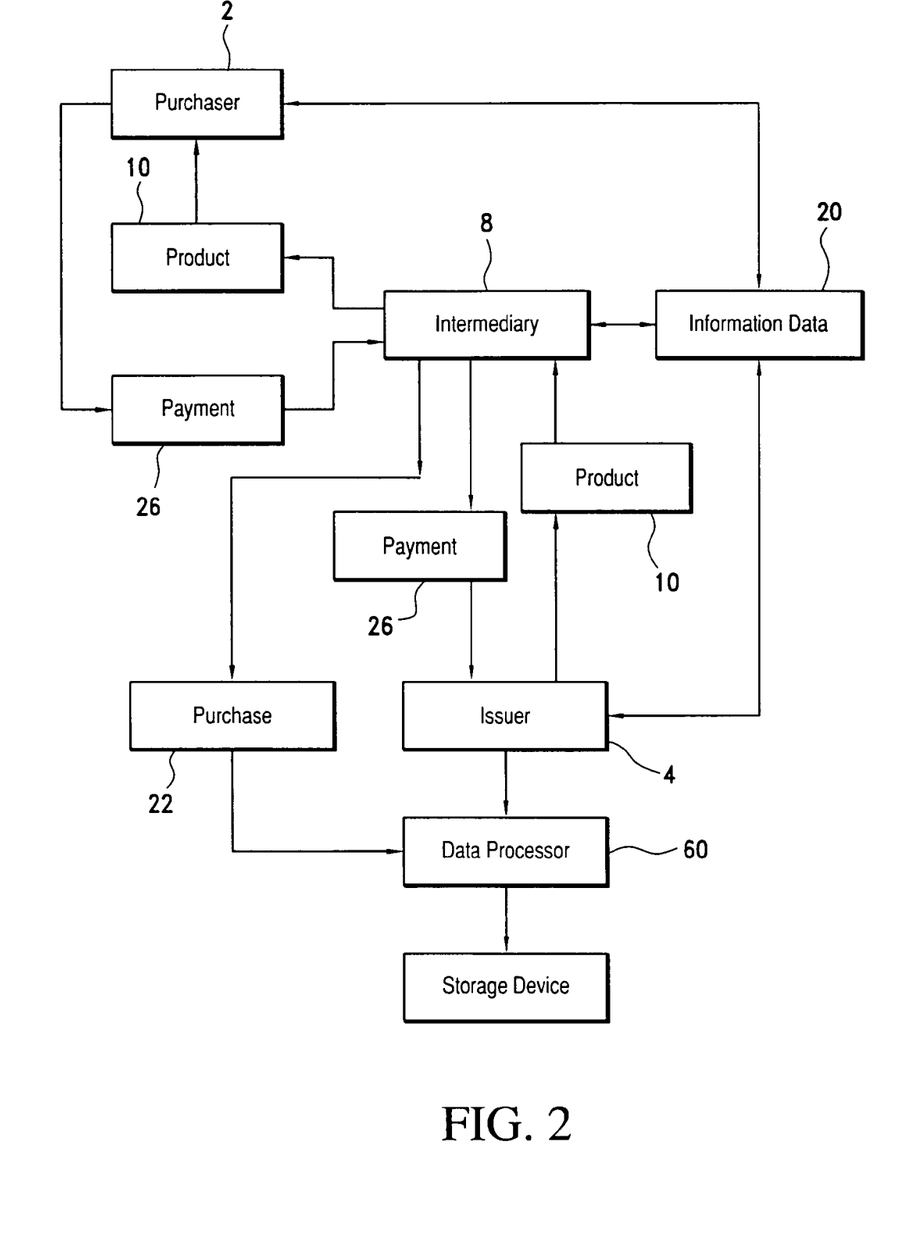
FIG. 2 is a block diagram illustrating the incorporation of an intermediary in accordance with the present disclosure.

In implementing these representative systems and representative methods, as shown in FIG. 2, an intermediary (8), will generally provide for the transmission of information or data (20) to a purchaser (2), possibly in response to an inquiry from the purchaser (2) concerning the terms, pricing and payment details of one or more combinations of services and products (10) that reduce or eliminate adverse selection under the program generally with the assistance of a data processor (60). This exchange of information will generally include information about the needs of the purchaser (2) and will typically attempt to match these needs with products (10). This exchange of information will typically continue until the purchaser determines that the information is sufficient to decide whether to purchase or not to purchase the product and service combination offered. If the purchaser does not purchase, no further action is required, other than possibly determining to contact the purchaser at a future date. If the purchaser (2) purchases the combination including an insurance product (10), then the intermediary will record the purchase (22), arrange for or accept payment (26) and forward the information concerning the purchase, including any payment (26) to an issuer (4) which will receive the information (2) and payment and record each of them and provide the product (10) to the intermediary (8). The intermediary (8) may, in some cases have the ability to provide the product (10) to the purchaser (2) on behalf of the issuer (4) based on prescribed standards before payment and will generally provide the product after payment.

Figure 3:
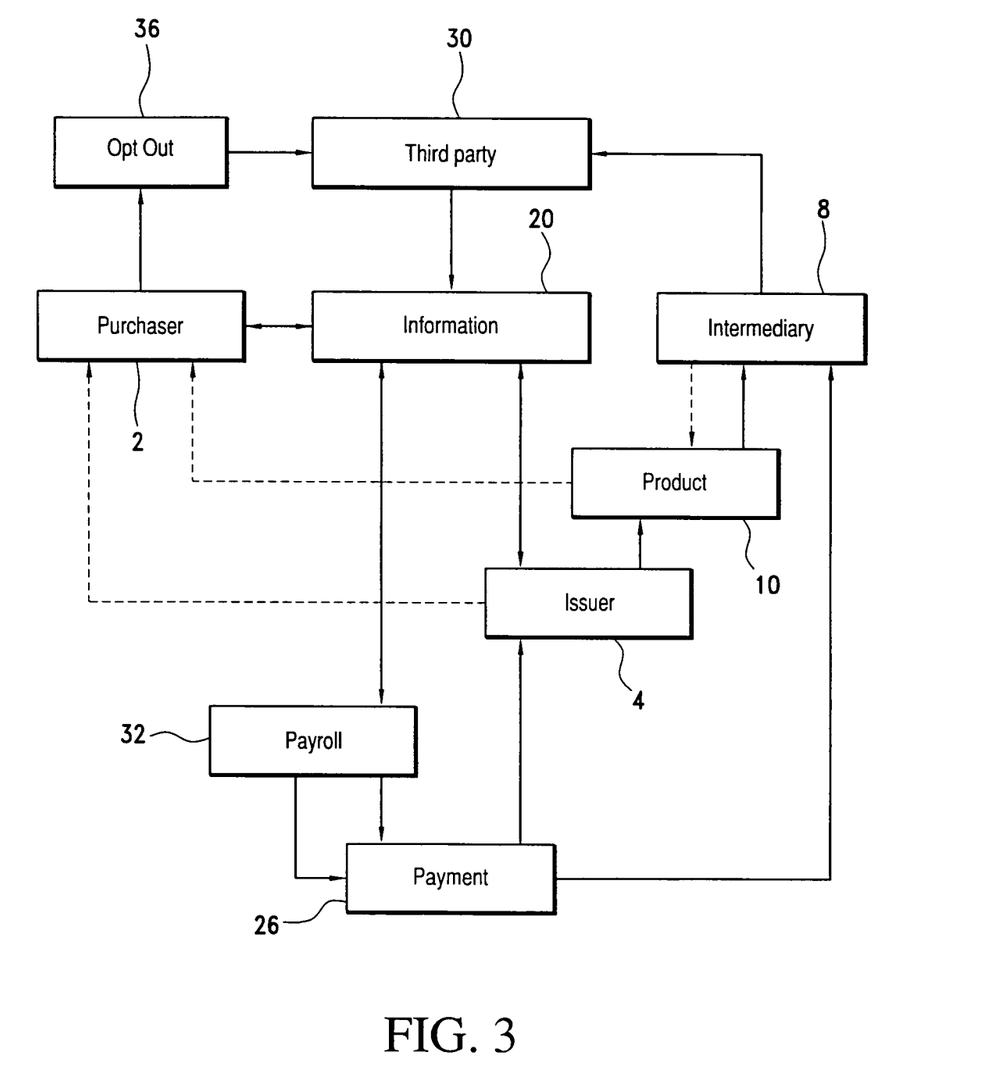
FIG. 3 is a block diagram illustrating the incorporation of a third party acting on behalf of a purchaser in accordance with the present disclosure.

As shown in FIG. 3, in cases where a third party (30) (e.g., and employer of an employee or a fiduciary of an employee benefit plan) acts on behalf of a purchaser (2), the third party, generally after negotiation, will direct the purchase of a combination of products (10) and/or services from an issuer (4) on behalf of a purchaser from an intermediary. The third party (30) will inform (20) the purchaser of the specifics of the purchase. In some cases the purchaser will have an opportunity to opt out (36) of the purchase, in which case the purchase will be cancelled by transferring information to the payroll processor. The third party (30) will also inform the issuer (4) and/or an intermediary if one is used, of the specifics of the purchase. The third party (30) can then arrange for payment, including payment through automatic withholding by contacting the payroll processor (32). The product (10) may be delivered by an intermediary (8) or an issuer (4).

Figure 4:
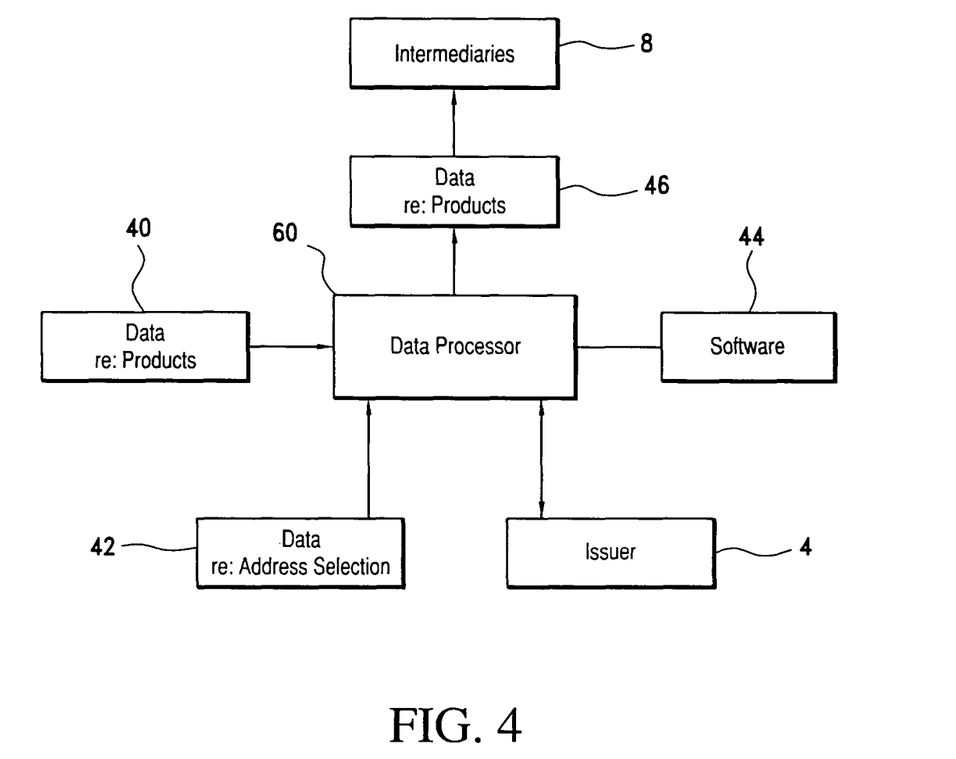
FIG. 4 is a block diagram illustrating an issuer receiving data concerning product lines in accordance with the present disclosure.

As shown in FIG. 4, an issuer (4) will receive data (40) concerning it product lines and adjust its offering of products and data concerning adverse selection (42) and use software (44) used in a data processor (60) that incorporates its business objectives to combine and price combinations of products (10) and services. It will then provide the prices and combinations to the market, including intermediaries (8).

Figure 5:
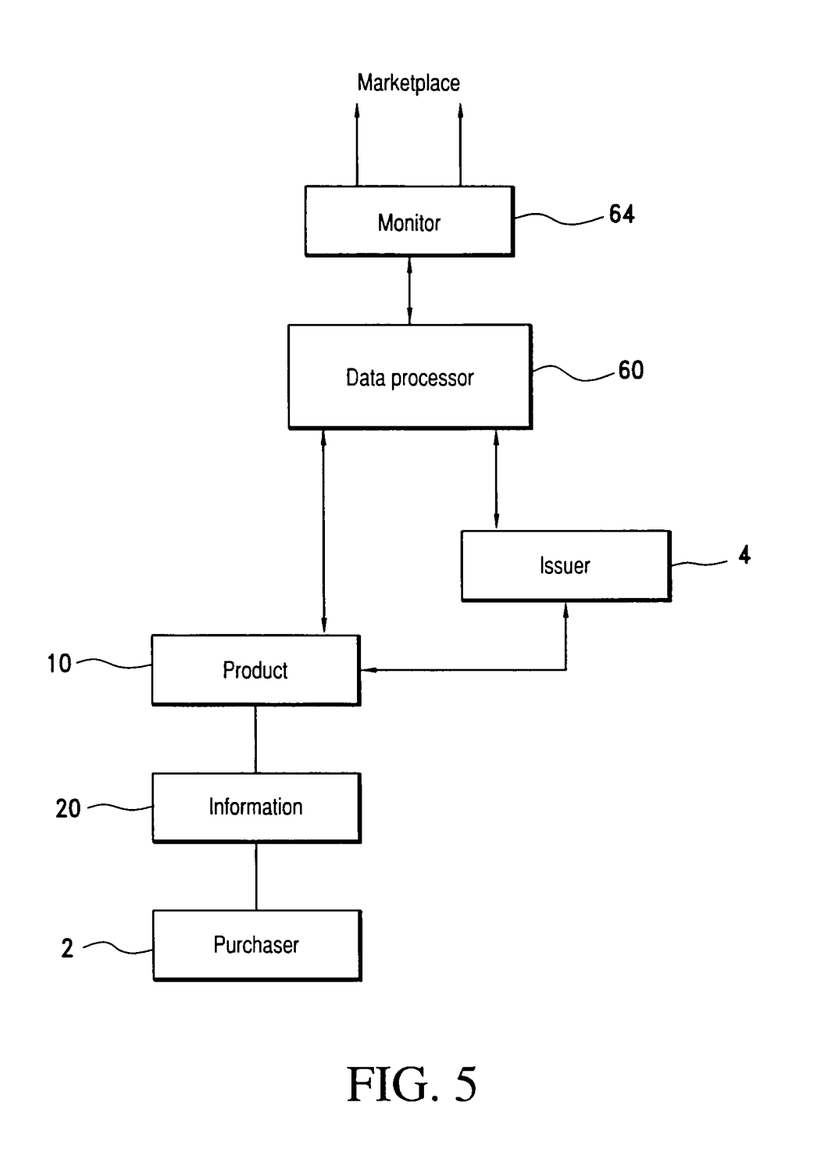
FIG. 5 is a block diagram illustrating an issuer monitoring marketplace developments in accordance with the present disclosure.

As shown in FIG. 5, once a combination is sold, the issuer (10) will monitor, with a monitor (64) developments in the marketplace (50) so that the products (10) it has sold will change in accordance with its terms. For example if an investment index reaches a certain price, the products terms may change and the issuer (10) will generally inform the purchaser (2) of the changes.

Figure 6:
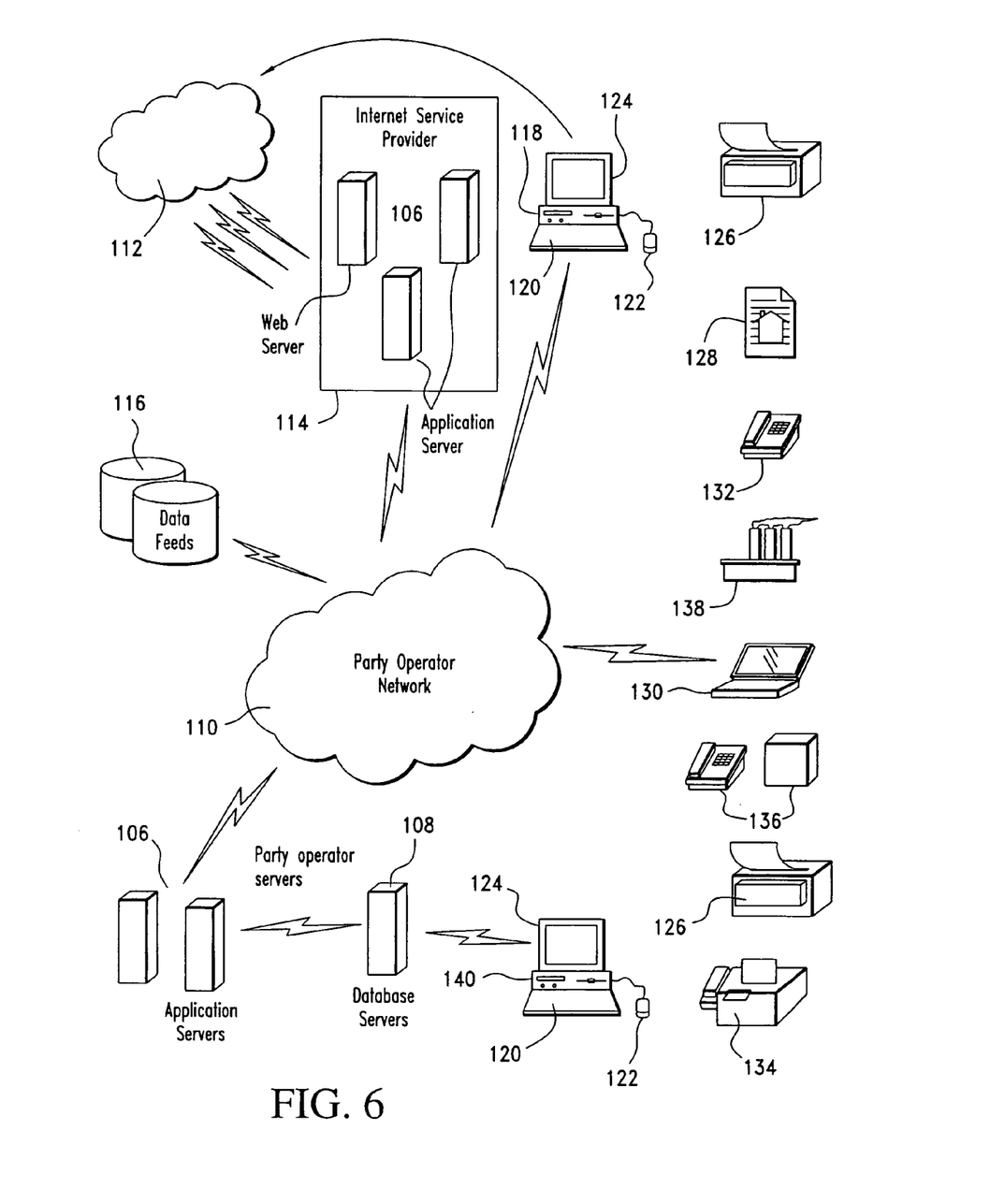
FIG. 6 is a block diagram illustrating hardware involved in the operation of the disclosure.

As is illustrated in FIG. 6, the provision of these products and services under the systems and methods of the present invention may require certain computer hardware, including but not limited to a mainframe computer or servers(s) 106 for processing large volumes of data stored in a data storage unit 108 and a communications system, including but not limited to intranet, internet 112 and other communications vehicles, as known to those skilled in the art. The stored data is taken from data provided by the purchaser 2 or third parties 30 as described above. A personal computer or workstation 118 having a hard drive or other storage device, an input device such as a keyboard 120 and mouse 122, and an output device such as a display 124 and printer 126 are operatively connected to the computer 118, as is known to those skilled in the art. In particular, computer programs used to implement the formulation of the products and/or services as well as their sale and servicing loaded on the application servers 108 are used accessed by, or on behalf of the program operator 6 and are used to transmit under this system and method, in a tangible form to purchasers 2, as is known to those skilled in the art.

What is claimed:

1. A method for automatically allocating funds within a retirement investor's investment vehicle, comprising the steps of:

storing personal information corresponding to the retirement investor in a computerized database;

using a computer to deduct funds automatically from the pay of the retirement investor, and automatically placing those deducted funds in deferred annuity associated with the retirement plan;

informing the retirement investor of the specifics concerning the annuity and that the retirement investor may opt out of the purchase;

providing the retirement investor with a choice to opt out of the purchase of the deferred annuity;

where the retirement investor does choose to opt out using a computer to cease the use of related deductions to purchase the deferred annuity; and using a computer to record the decision of the retirement investor and transmit information to the payroll processor of the retirement investor's employer concerning the retirement investor's decision.

2. A method for using at least one computer to offer a combination of a deferred annuity and money management comprising the steps of:

storing information concerning at least one deferred annuity in a computerized database;

storing information concerning at least one money management product in a computerized database;

projecting how different combinations of deferred annuities and money management will affect adverse selection;

using such projections to price at least one combination of said products;

using a computer program attached to a computer to record the acquisition of a deferred annuity combined with a money-management product.

3. A method for automatically allocating funds within a retirement investor's investment vehicle, comprising the steps of:

storing personal information corresponding to the retirement investor in a computerized database;

storing information concerning at least one annuity in a computerized database;

storing information concerning at least one money management product in a computerized database;

projecting how different combinations of annuities and money management will affect adverse selection;

using such projections to price at least on combination of said products;

using a computer to deduct funds automatically from the pay of the retirement investor, and automatically placing those deducted funds in an annuity associated with the retirement plan, using a computer program attached to a computer to combine the annuity with a money-management product in a manner projected to reduce adverse selection based on said projections;

informing the retirement investor of the specifies concerning the annuity and that the retirement investor may opt out of the purchase;

providing the retirement investor with a choice to opt out of the purchase of the annuity;

where the retirement investor does choose to opt out using a computer to cease the use of related deductions to purchase the annuity; and using a computer to record the decision of the retirement investor and transmit information to the payroll processor of the retirement investor's employer concerning the retirement investor's decision.

* * * * *